US008302396B2

(12) United States Patent
Usukura et al.

(10) Patent No.: US 8,302,396 B2
(45) Date of Patent: Nov. 6, 2012

(54) CONTROL METHOD FOR HYDRAULIC TYPE CONTINUOUSLY VARIABLE TRANSMISSION

(75) Inventors: Yasutaka Usukura, Saitama (JP); Kazuhiko Nakamura, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 954 days.

(21) Appl. No.: 12/361,226

(22) Filed: Jan. 28, 2009

(65) Prior Publication Data

US 2009/0193802 A1    Aug. 6, 2009

(30) Foreign Application Priority Data

Jan. 31, 2008    (JP) ................................. 2008-021722

(51) Int. Cl.
*F16D 31/02*    (2006.01)
(52) U.S. Cl. ................................. 60/431; 60/449; 60/489
(58) Field of Classification Search .................... 60/431, 60/448, 449, 487, 489, 490, 491, 492
See application file for complete search history.

(56) References Cited

FOREIGN PATENT DOCUMENTS

| DE | 198 08 101 A1 | 8/1998 |
|----|---------------|--------|
| DE | 101 26 353 A1 | 12/2001 |
| JP | 7-56338 A | 6/1995 |
| JP | 8-6797 B2 | 1/1996 |
| JP | 2006-200727 A | 8/2006 |

*Primary Examiner* — Michael Leslie
(74) *Attorney, Agent, or Firm* — Birch, Stewart, Kolasch & Birch, LLP

(57) ABSTRACT

A control method for a hydraulic type continuously variable transmission for suppressing a harmful effect due to the reacceleration just after deceleration of a vehicle. In a hydraulic type continuously variable transmission, the operation of a shifting actuator is stopped to suspend the shift control (S7) when a throttle valve is rapidly opened just after fully closed (S4: Yes) and an engine speed NE [rpm] is being rapidly increased (S6: Yes). Accordingly, even when the actual engine speed NE becomes much greater than a target engine speed T_NE during reacceleration just after deceleration of a vehicle, unexpected shift control (upshifting) can be prevented, so that more desirable torque can be produced.

20 Claims, 7 Drawing Sheets

CONTROL METHOD FOR HYDRAULIC TYPE CONTINUOUSLY VARIABLE TRANSMISSION

CROSS-REFERENCE TO RELATED APPLICATIONS

The present application claims priority under 35 USC 119 to Japanese Patent Application No. 2008-021722 filed on Jan. 31, 2008 the entire contents of which are hereby incorporated by reference.

BACKGROUND OF THE INVENTION

1. Field of the Invention

The present invention relates to a control method for a hydraulic type continuously variable transmission such that a high-pressure oil passage and a low-pressure oil passage are formed between a hydraulic pump and a hydraulic motor.

2. Description of Background Art

A hydraulic type continuously variable transmission is known as a continuously variable transmission for use in a vehicle such as a motorcycle (See, for example, Japanese Patent Publication No. Hei 7-56338, Japanese Patent Publication No. Hei 8-06797 and Japanese Patent Laid-open No. 2006-200727). FIG. 1 shows a hydraulic type continuously variable transmission 10 (which will be hereinafter referred to also as "continuously variable transmission 10") in the existing art (cited from FIG. 9 of Japanese Patent Laid-open No. 2006-200727). In the hydraulic type continuously variable transmission 10, torque from an engine 14 is input to a hydraulic pump 12. In the hydraulic pump 12, the input torque is converted into an oil pressure of a working fluid 22 by using an input shaft 16, a pump swash plate 18, and a pump plunger 20. The working fluid 22 is transmitted through an annular high-pressure oil passage 26 in a hydraulic closed circuit 24 to a hydraulic motor 28. In the hydraulic motor 28, the oil pressure of the working fluid 22 is reconverted into torque by using a motor plunger 30, a motor swash plate 32, and an output shaft 34, and the torque is output from the output shaft 34.

The magnitude of the torque to be transmitted from the input shaft 16 to the output shaft 34 can be changed by using a shifting actuator 36 to adjust the angle of the motor swash plate 32 in the hydraulic motor 28. In other words, the ratio between the input torque of the hydraulic pump 12 and the output torque of the hydraulic motor 28 (which will be hereinafter referred to also as "speed ratio R") can be adjusted by adjusting the angle of the motor swash plate 32. The working fluid 22 transmitted from the hydraulic pump 12 to the hydraulic motor 28 is returned to the hydraulic pump 12 through an annular low-pressure oil passage 38 in the hydraulic closed circuit 24 for the purpose of reuse.

The present inventor has studied to find that when reacceleration is performed just after reduction of an actual engine speed NE [rpm] (i.e., when a target engine speed T_NE [rpm] is rapidly increased just after reduction of a vehicle speed V [km/h]), the actual engine speed NE temporarily becomes much greater than the target engine speed T_NE as shown in FIG. 7. This point has been further studied to estimate the pressure of the following cause.

When the vehicle is accelerated (i.e., when the rotational speed of the input shaft 16 of the hydraulic pump 12 is increased), torque transmission is performed from the hydraulic pump 12 to the hydraulic motor 28 in the hydraulic type continuously variable transmission 10, so that the oil pressure of the working fluid 22 in the high-pressure oil passage 26 becomes relatively high and the oil pressure of the working fluid 22 in the low-pressure oil passage 38 becomes relatively low. In contrast, when the vehicle is decelerated (i.e., when the rotational speed of the input shaft 16 of the hydraulic pump 12 is decreased), torque transmission from the hydraulic pump 12 to the hydraulic motor 28 is not performed (conversely, torque transmission from the hydraulic motor 28 to the hydraulic pump 12 is performed), so that the oil pressure of the working fluid 22 in the high-pressure oil passage 26 becomes relatively low and the oil pressure of the working fluid 22 in the low-pressure oil passage 38 becomes relatively high. Accordingly, when the vehicle is reaccelerated just after deceleration, both the oil pressure of the working fluid 22 in the high-pressure oil passage 26 and the oil pressure of the working fluid 22 in the low-pressure oil passage 38 temporarily become relatively high, causing a reduction in resistance in torque transmission from the hydraulic pump 12 to the hydraulic motor 28. As a result, the actual engine speed NE (the actual rotational speed of the input shaft 16 of the hydraulic pump 12) becomes much greater than the target engine speed T_NE (the target rotational speed of the input shaft 16) as mentioned above. Further, when the engine speed NE is increased, the angle of the motor swash plate 32 is adjusted so as to increase the speed ratio R in general (i.e., so as to obtain an effect similar to that obtained by upshifting). However, as shown in FIG. 7, a rapid increase in engine speed NE causes an unexpected increase in speed ratio R (an unexpected decrease in output torque), so that desirable torque cannot be produced to cause a reduction in operability.

SUMMARY AND OBJECTS OF THE INVENTION

It is accordingly an object of an embodiment of the present invention to provide a control method for a hydraulic type continuously variable transmission which can suppress a harmful effect due to the reacceleration just after deceleration of a vehicle. It is another object of an embodiment of the present invention to provide a control method for a hydraulic type continuously variable transmission which can improve the operability of a vehicle during the reacceleration just after deceleration.

In accordance with an embodiment of the present invention, there is provided a control method for a hydraulic type continuously variable transmission having a hydraulic pump adapted to be rotationally driven by a drive source, a hydraulic motor adapted to be rotationally driven by an oil pressure generated by said hydraulic pump, and a hydraulic circuit having a high-pressure oil passage for feeding a working fluid from said hydraulic pump to said hydraulic motor and a low-pressure oil passage for feeding said working fluid from said hydraulic motor to said hydraulic pump. The control method includes the steps of determining whether or not a reaccelerating operation just after a decelerating operation is performed in said hydraulic type continuously variable transmission and correcting for an alienation between an actual output and a target output from said hydraulic motor due to the pressure difference between said high-pressure oil passage and said low-pressure oil passage when said reaccelerating operation is performed.

According to an embodiment of the present invention, even when the reaccelerating operation is performed just after the deceleration and there occurs an alienation between an actual output and a target output from the hydraulic motor due to the pressure difference between the high-pressure oil passage and the low-pressure oil passage, this alienation can be corrected to thereby suppress a harmful effect due to the reaccelerating operation.

In this description, the term of "hydraulic type continuously variable transmission" is used in a broad sense and it means not only a transmission having only a hydraulic torque transmitting mechanism, but also a transmission further having a mechanical torque transmitting mechanism.

Preferably, said drive source comprises an engine; said determining step is performed according to the rate of increase in throttle angle and the rate of increase in engine speed; and said correcting step is performed by suspending shift control in said hydraulic type continuously variable transmission when said reaccelerating operation is performed. Accordingly, even when the engine speed is rapidly increased due to the reacceleration just after deceleration, unexpected shift control (upshifting) can be prevented, so that more desirable torque can be produced. The rate of increase in throttle angle can be determined not only from the motion of a throttle valve itself, but also from the amount of operation of a throttle grip, for example. In other words, the amount of operation of a throttle grip can be regarded as a throttle angle.

Preferably, said shift control is resumed according to a decrease in the rate of increase in said engine speed or when said engine speed is lowered to a target value. Accordingly, the shift control is suspended only when there occurs a harmful effect due to said reaccelerating operation, and the shift control can be immediately resumed when the harmful effect is removed.

According to an embodiment of the present invention, even when the reaccelerating operation is performed just after the deceleration and there occurs an alienation between an actual output and a target output from the hydraulic motor due to the pressure difference between the high-pressure oil passage and the low-pressure oil passage, this alienation can be corrected to thereby suppress a harmful effect due to the reaccelerating operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the drawings.

Figure 1:
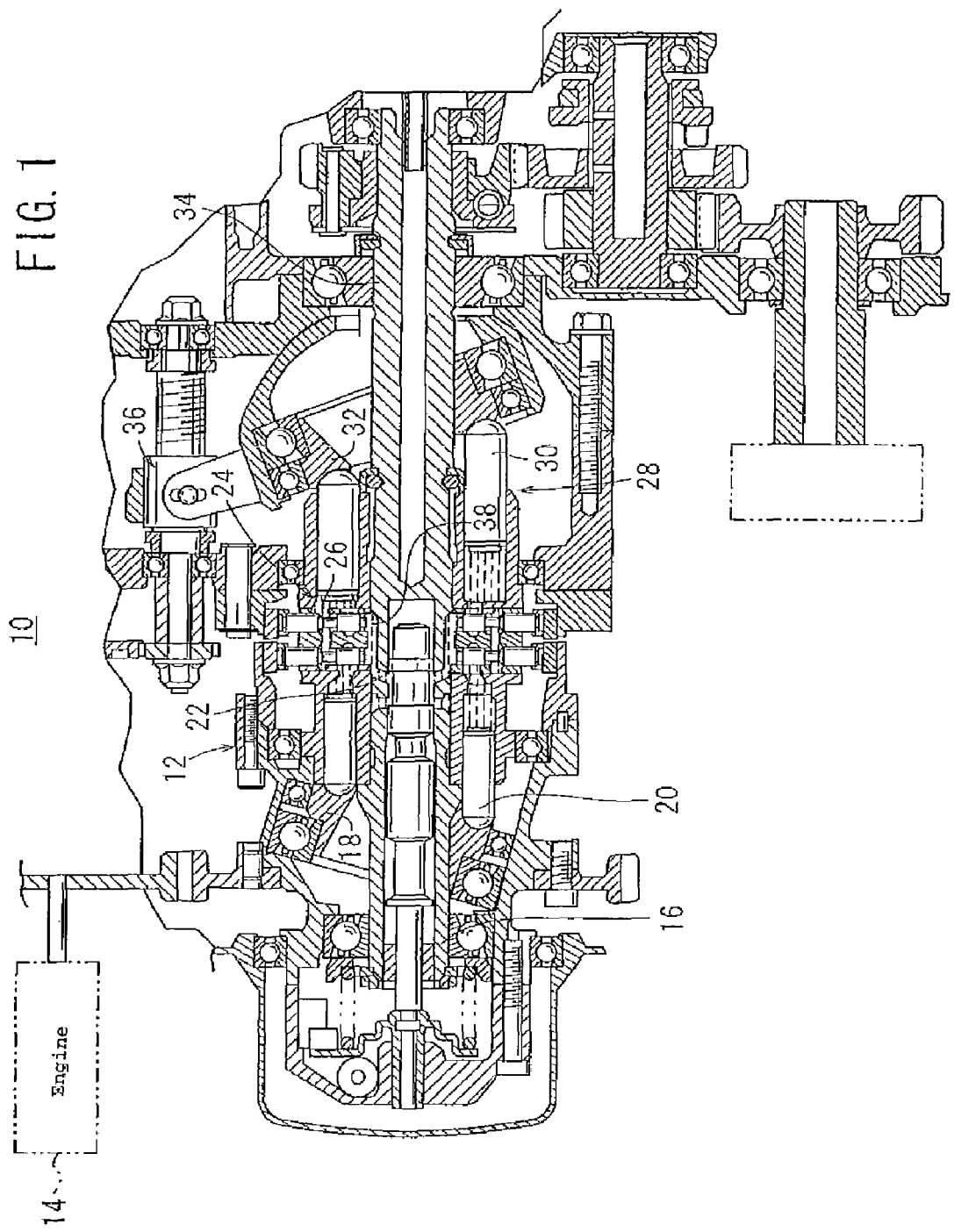
FIG. 1 is a partially cutaway, sectional view of a hydraulic type continuously variable transmission in the existing art and according to a preferred embodiment of the present invention.
Figure 2:
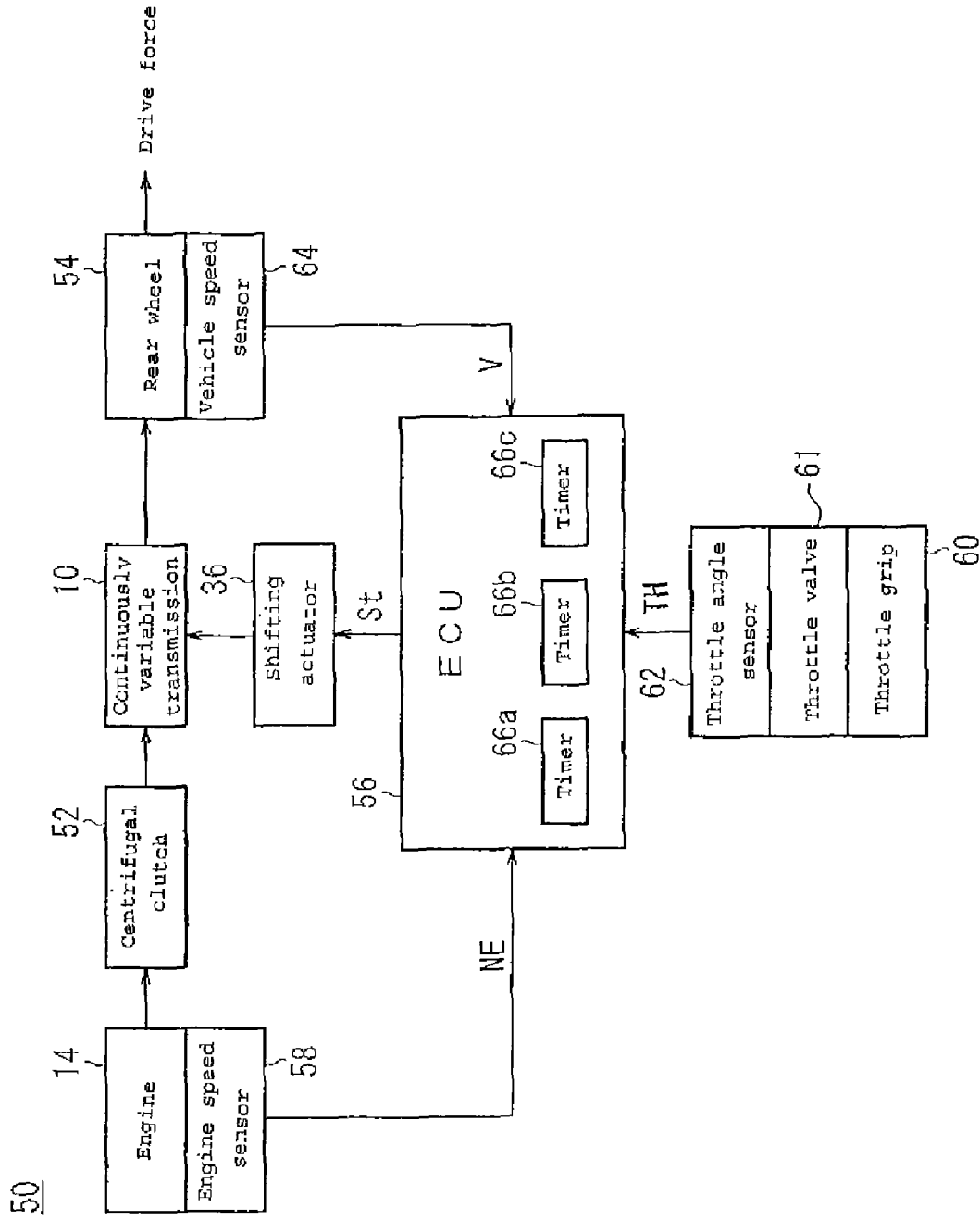
FIG. 2 is a block diagram of a vehicle including the hydraulic type continuously variable transmission shown in FIG. 1.

FIG. 2 is a schematic block diagram of a vehicle 50 such as a motorcycle including a hydraulic type continuously variable transmission according to a preferred embodiment of the present invention. Basically, the hydraulic type continuously variable transmission according to this preferred embodiment may adopt the hardware of the hydraulic type continuously variable transmission 10 shown in FIG. 1. Accordingly, the reference numerals shown in FIG. 1 will be used as they are for the description of this preferred embodiment.

In the vehicle 50, torque generated in an engine 14 is transmitted through a centrifugal clutch 52 and a continuously variable transmission 10 to a rear wheel 54. The continuously variable transmission 10 is operated through a shifting actuator 36 by an ECU (electrical control unit) 56 mounted on the vehicle 50, thereby performing a shift operation. The ECU 56 produces a control signal St according to an engine speed NE [rpm] detected by an engine speed sensor 58, an opening angle (throttle angle TH [deg]) of a throttle valve 61 detected by a throttle angle sensor 62 according to the operation of a throttle grip 60, and a vehicle speed V [km/h] detected by a vehicle speed sensor 64. The ECU 56 operates the shifting actuator 36 according to the control signal St, thereby controlling the angle Di [deg] of a motor swash plate 32 (which angle Di substantially corresponds to the speed ratio R).

The ECU 56 controls the speed ratio R according to the difference between an actual engine speed NE and a target engine speed T_NE. When the actual engine speed NE is lower than the target engine speed T_NE, the ECU 56 decreases the speed ratio R (downshifting), whereas when the actual engine speed NE is higher than the target engine speed T_NE, the ECU 56 increases the speed ratio R (upshifting). Further, when the actual engine speed NE is equal to the target engine speed T_NE, the ECU 56 does not change the speed ratio R. The target engine speed T_NE is calculated according to the throttle angle TH and the vehicle speed V.

Figure 3:
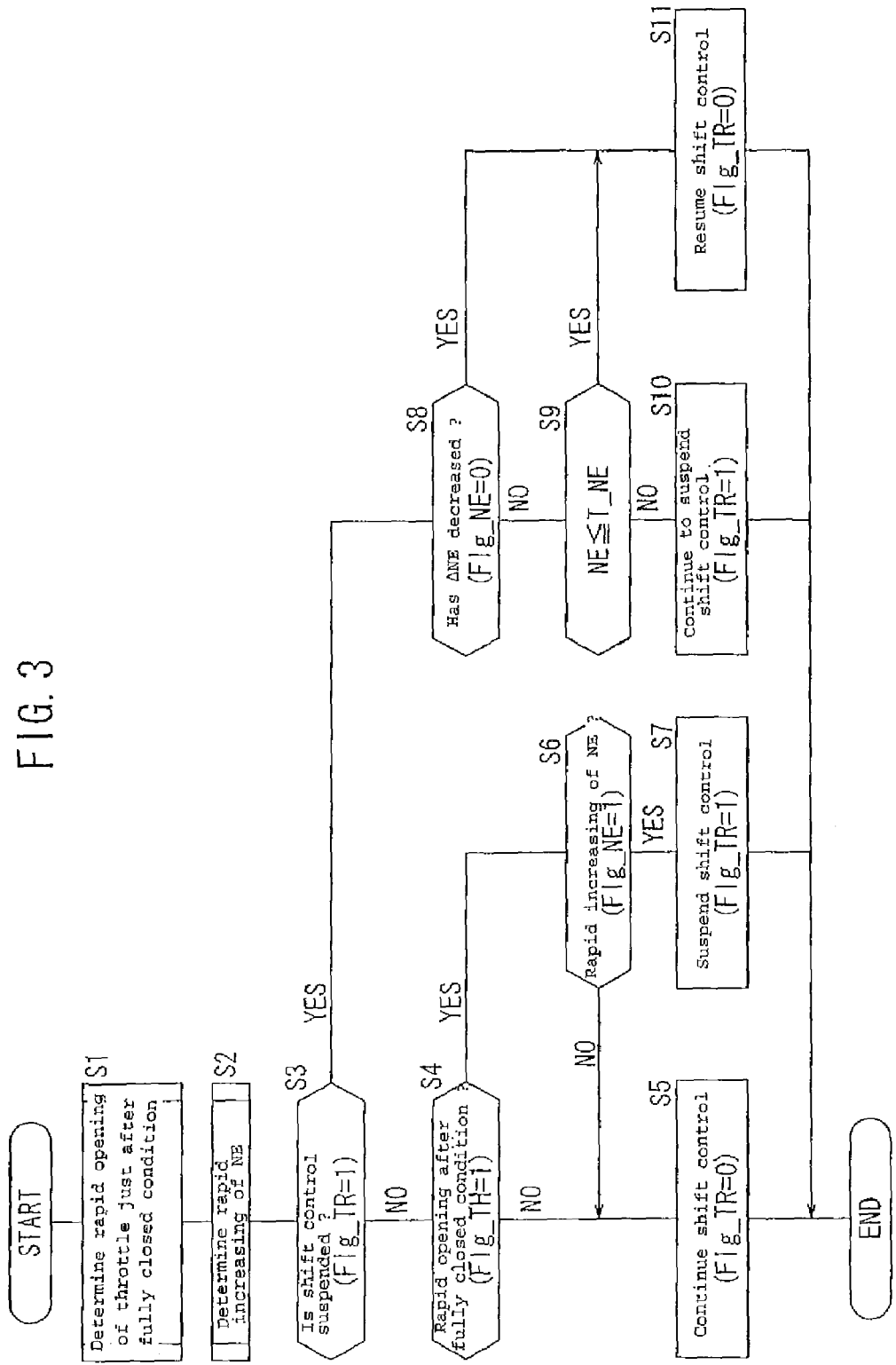
FIG. 3 is a flowchart showing the processing for switching between the execution of the shift control and the suspension of the shift control in the preferred embodiment.

FIG. 3 is a flowchart showing the processing of temporarily stopping the shift control in the case that reacceleration is performed just after deceleration of the vehicle 50. This processing is performed in the ECU 56.

In step S1, it is determined whether or not after the throttle valve 61 is closed to a predetermined threshold value (first threshold angle TH_TH1 [deg]), the throttle valve 61 is opened to another threshold value (second threshold angle TH_TH2 [deg]) within a predetermined time (first predetermined time T1 [see]). More specifically, it is determined whether or not the throttle valve 61 is rapidly opened just after it is fully closed. The wording of "fully closed" means that the throttle angle TH of the throttle valve 61 becomes a minimum throttle angle TH_MIN [deg]. Further, the wording of "rapidly opened" means that the throttle angle TH of the throttle valve 61 becomes a maximum throttle angle TH_MAX [deg] within the first predetermined time T1. In consideration of a determination error or the like, the first threshold angle TH_TH1 may be set to a value slightly larger than the minimum throttle angle TH_MIN. Similarly, the second threshold angle TH_TH2 may be set to a value slightly smaller than the maximum throttle angle TH_MAX.

Figure 4:
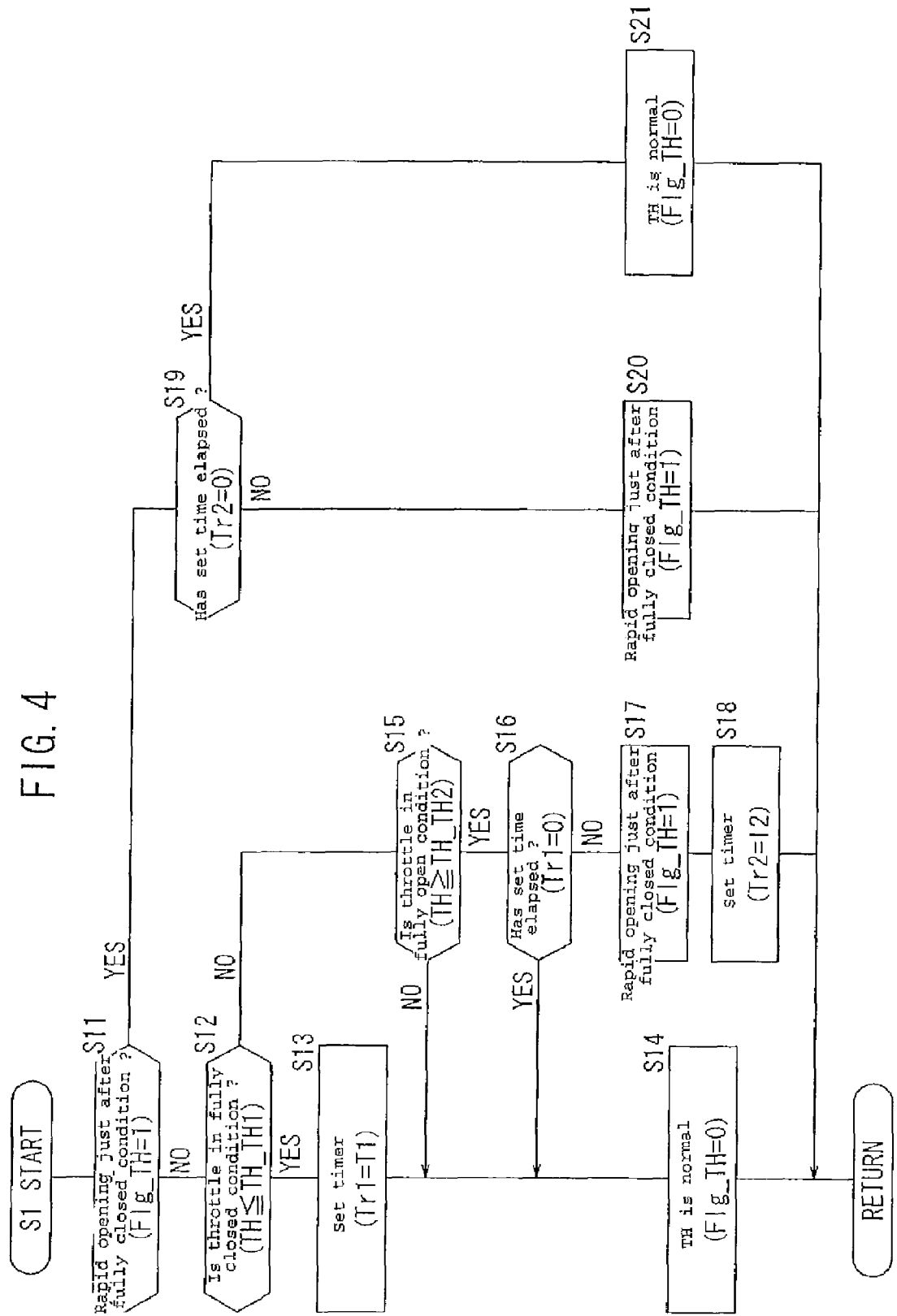
FIG. 4 is a flowchart showing the processing for determining rapid opening of the throttle just after it is fully closed in the preferred embodiment.

FIG. 4 shows a subroutine of step S1 shown in FIG. 3. In step S11 in FIG. 4, the ECU 56 checks whether or not the rapid opening of the throttle valve 61 just after the fully closed condition thereof has been determined in the previous subroutine. In other words, the ECU 56 checks whether a throttle condition determination flag Flg_TH (which will be hereinafter referred to also as "flag Flg_TH") is "0" or "1." The flag Flg_TH indicates whether or not the throttle valve 61 is being rapidly opened just after it is fully closed. That is, when the flag Flg_TH is "0," it indicates that such rapid opening of the throttle valve 61 is not being performed, whereas when the flag Flg_TH is "1," it indicates that such rapid opening of the throttle valve 61 is being performed. The initial value for the flag Flg_TH is "0."

If the flag Flg_TH is "0" in step S11 (S11: No), the program proceeds to step S12 to determine whether or not the throttle valve 61 is in the fully closed condition at present. In other words, it is determined whether or not the present throttle angle TH detected by the throttle angle sensor 62 is less than or equal to the first threshold angle TH_TH1. If the throttle valve 61 is in the fully closed condition in step S12 (S12: Yes), the program proceeds to step S13 to set a first timer 66a provided in the ECU 56 to the first predetermined time T1. In other words, the remaining time of the first timer 66a (first remaining time Tr1 [sec]) is set to the first predetermined time T1. In step S14, the ECU 56 maintains the flag Flg_TH at "0."

If the throttle valve 61 is not in the fully closed condition in step S12 (S12: No), it is determined in steps S15 and S16 whether or not the throttle valve 61 is being rapidly opened. More specifically, in step S15, it is determined whether or not the present throttle angle TH is greater than or equal to the second threshold angle TH_TH2. If the throttle valve 61 is not in the fully open condition in step S15 (S15: No), the program proceeds to step S14 to maintain the flag Flg_TH at "0." If the throttle valve 61 is in the fully open condition in step S15 (S15: Yes), the program proceeds to step S16.

In step S16, the ECU 56 determines whether or not the first predetermined time T1 set in the first timer 66a in step S13 has elapsed (i.e., whether or not the first remaining time Tr1 of the first timer 66a is zero). If the first predetermined time T1 has elapsed (S16: Yes), the program proceeds to step S14 to maintain the flag Flg_TH at "0." If the first predetermined time T1 has not elapsed (S16: No), the program proceeds to step S17 to determine that the throttle valve 61 is being rapidly opened just after it is fully closed, i.e., to set the flag Flg_TH to "1." In step S18, the time (second predetermined time T2 [sec]) during which the throttle valve 61 is being rapidly opened just after it is fully closed is set in a second timer 66b provided in the ECU 56. In other words, the remaining time of the second timer 66b (second remaining time Tr2 [sec]) is set to the second predetermined time T2.

In other words, it is determined in steps S15 and S16 whether or not the rate of increase in the throttle angle TH (throttle angle increase rate $\Delta$TH [deg/sec]) is greater than or equal to a predetermined threshold value (threshold increase rate TH_$\Delta$TH).

If the flag Flg_TH is "1" in step S11 (S11: Yes), the program proceeds to step S19 to determine whether or not the second predetermined time T2 set in step S18 has elapsed (i.e., whether or not the second remaining time Tr2 of the second timer 66b is zero). If the second predetermined time T2 has not elapsed (S19: No), the program proceeds to step S20 to determine that the throttle valve 61 is being rapidly opened just after it is fully closed. That is, in step S20, the flag Flg_TH is maintained at "1." If the second predetermined time T2 has elapsed (S19: Yes), the program proceeds to step S21 to determine that the rapid opening of the throttle valve 61 after the fully closed condition has once been finished. That is, the flag Flg_TH is returned to "0."

Figure 5:
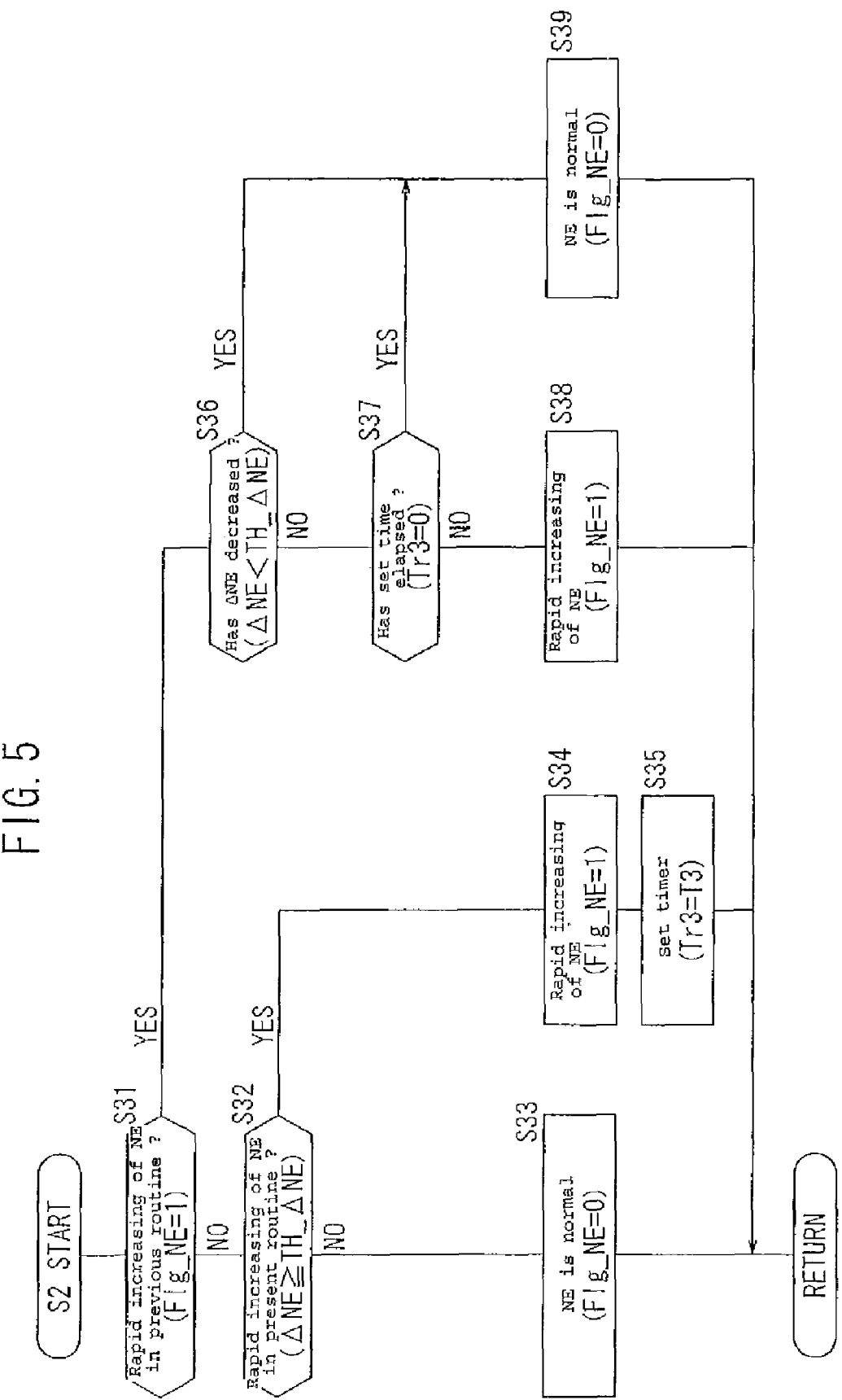
FIG. 5 is a flowchart showing the processing for determining rapid increasing of the engine speed in the preferred embodiment.

Referring back to FIG. 3, the ECU 56 determines in step S2 whether or not the engine speed NE is being rapidly increased. FIG. 5 shows a subroutine of step S2 shown in FIG. 3. In step S31, the ECU 56 checks whether or not the rapid increasing of the engine speed NE has been determined in the previous subroutine. In other words, the ECU 56 checks whether an engine condition determination flag Flg_NE (which will be hereinafter referred to also as "flag Flg_NE") is "0" or "1." The flag Flg_NE indicates whether or not the engine speed NE is being rapidly increased. That is, when the flag Flg_NE is "0," it indicates that the engine speed NE is not being rapidly increased (i.e., the engine speed NE is normal), whereas when the flag Flg_NE is "1," it indicates that the engine speed NE is being rapidly increased. The initial value for the flag Flg_NE is "0."

If the flag Flg_NE is "0" in step S31 (S31: No), the program proceeds to step S32 to determine whether or not the engine speed NE is being rapidly increased at present. In other words, it is determined whether or not the rate of increase in the present engine speed NE detected by the engine speed sensor 58 {engine speed increase rate $\Delta$NE (which wilt be hereinafter referred to also as "increase rate $\Delta$NE")} is greater than or equal to a predetermined threshold value {threshold engine speed increase rate TH_$\Delta$NE [rev/sec] (which will be hereinafter referred to also as "threshold increase rate TH_$\Delta$NE)}. If the increase rate $\Delta$NE is less than the threshold increase rate TH_$\Delta$NE (S32: No), the program proceeds to step S33 to maintain the flag Flg_NE at "0." I If the increase rate $\Delta$NE is greater than or equal to the threshold increase rate TH_$\Delta$NE (S32: Yes), the program proceeds to step S34 to change the flag Flg_NE to "1." In step S35, the time (third predetermined time T3 [sec]) during which the engine speed NE is being rapidly increased (i.e., the time for maintaining the flag Flg_NE at "1") is set in a third timer 66c provided in the ECU 56.

If the flag Flg_NE is "1" in the previous subroutine (S31: Yes), the program proceeds to step S36 to determine whether or not the rapid increase in engine speed NE has been finished. In other words, it is determined whether or not the engine speed increase rate $\Delta$NE has become less than the threshold increase rate TH_$\Delta$NE. If the increase rate $\Delta$NE is still greater than or equal to the threshold increase rate TH_$\Delta$NE (S36: No), the program proceeds to step S37 to determine whether or not the third predetermined time T3 set in step S35 has elapsed (i.e., whether or not the remaining time Tr3 of the third timer 66c is zero). If the third predetermined time T3 has not elapsed (S37: No), the program proceeds to step S38 to determine that the engine speed NE is being rapidly increased, so that the flag Flg_NE is maintained at "1."

If the engine speed increase rate $\Delta$NE is less than the threshold increase rate TH_$\Delta$NE in step S36 (S36: Yes) or if the third predetermined time T3 has elapsed in step S37 (S37: Yes), the program proceeds to step S39 to determine that the rapid increase in engine speed NE has been finished, so that the flag Flg_NE is returned to "0."

Referring back to FIG. 3, the ECU 56 determines in step S3 whether or not the shift control is suspended at present. In other words, it is determined whether a shift control flag Flg_TR (which will be hereinafter referred to also as "flag Flg_TR") is "0" or "1." The flag Flg_TR indicates whether or not the shift control is suspended. That is, when the flag Flg_TR is "0," it indicates that the shift control is not suspended (i.e., the shift control is continued), whereas when the flag Flg_TR is "1," it indicates that the shift control is suspended. The initial value for the flag Flg_TR is "0."

If the flag Flg_R is "0" in step S3 (S3: No), the program proceeds to step S4 to check the throttle condition determination flag Flg_TH set in step S1, i.e., to check whether or not the throttle valve 61 is being rapidly opened just after it is fully closed. If the flag Flg_TH is "0" in step S4 (i.e., if the throttle valve 61 is not being rapidly opened just after it is fully closed) (S4: No), the program proceeds to step S5 to maintain the flag Flg_TR at "0," i.e., to continue the shift control. If the flag Flg_TH is "1" in step S4 (i.e., if the throttle valve 61 is being rapidly opened just after it is fully closed) (S4: Yes), the program proceeds to step S6.

In step S6, the ECU 56 checks the engine condition determination flag Flg_NE set in step S2, i.e., it checks whether or not the engine speed NE is being rapidly increased. If the flag Flg_NE is "0" (i.e., if the engine speed NE is not being rapidly increased) (S6: No), the program proceeds to step S5 to maintain the flag Flg_TR at "0," i.e., to continue the shift control. If the flag Flg_NE is "1" (i.e., if the engine speed NE is being rapidly increased) (S6: Yes), the program proceeds to step S7 to change the flag Flg_TR to "1," i.e., to suspend the shift control. In other words, the ECU 56 temporarily stops the operation of the shifting actuator 36 of the hydraulic type continuously variable transmission 10 to inhibit a change in angle of the motor swash plate 32 (i.e., a change in speed ratio R).

If the shift control flag Flg_TR set in the previous routine is "1" in step S3, i.e., if the shift control is suspended (S3: Yes), the program proceeds to step S8 to determine whether or not the engine speed increase rate ΔNE has been reduced according to the engine condition flag Flg_NE set in step S2. If the flag Flg_NE is "1" in step S8 (i.e., if the increase rate ΔNE has not yet been reduced) (S8: No), the program proceeds to step S9 to determine whether or not the actual engine speed NE detected by the engine speed sensor 58 has been reduced to the target engine speed T_NE calculated by the ECU 56 (i.e., whether or not the engine speed NE is less than or equal to the target engine speed T_NE). If the engine speed NE is still greater than the target engine speed T_NE (S9: No), the program proceeds to step S10 to maintain the flag Flg_TR at "1," i.e., to continue to suspend the shift control. If the flag Flg_NE is "0" in step S8 (i.e., if the rapid increase of the engine speed NE has been finished (S8: Yes) or if the engine speed NE is less than or equal to the target engine speed T_NE in step S9 (S9: Yes), the program proceeds to step S11 to return the flag Flg_TR to "0," i.e., to resume the shift control.

Figure 6:
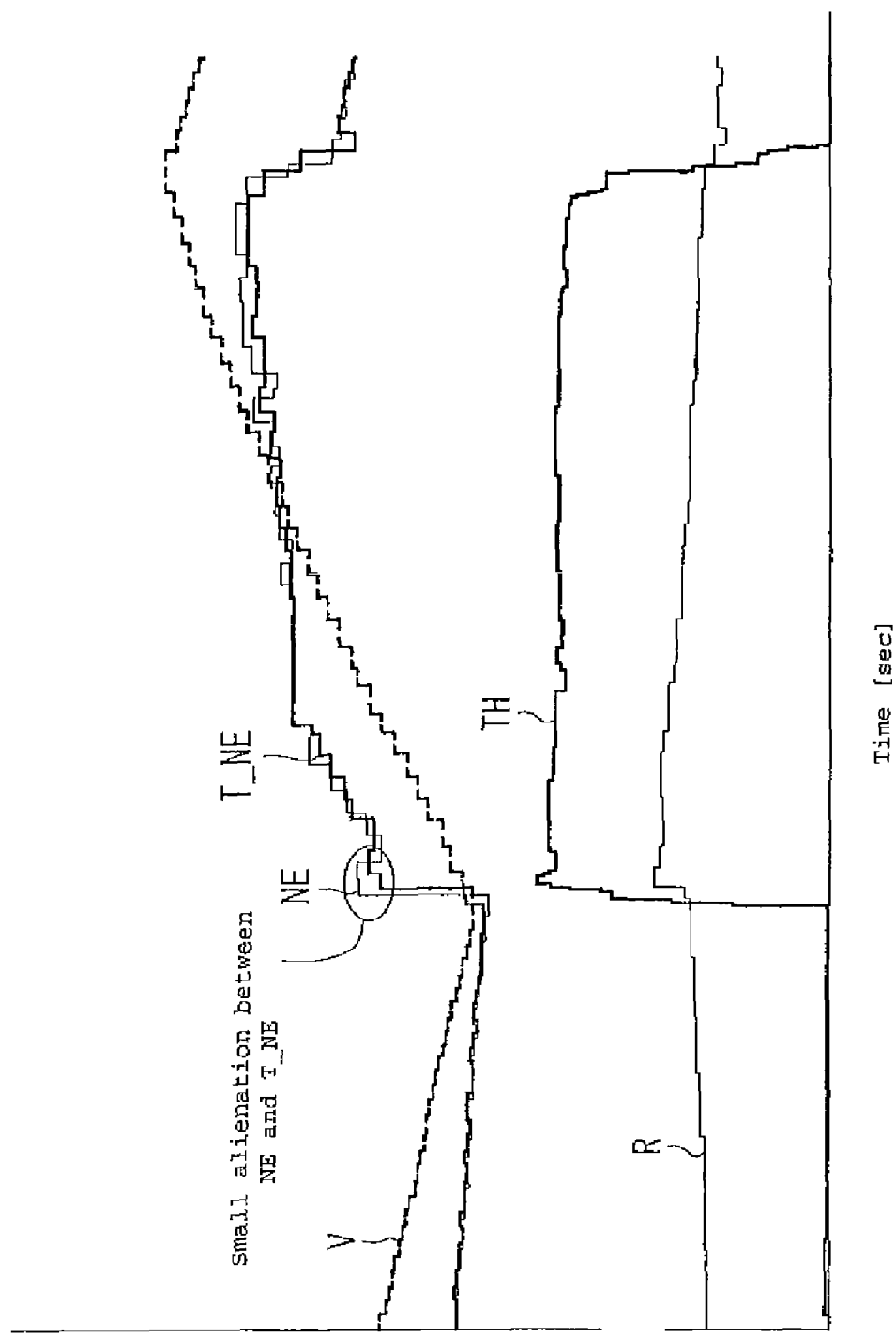
FIG. 6 is a graph showing an example of the effect of the preferred embodiment as obtained by using the processing shown in FIG. 3.
Figure 7:
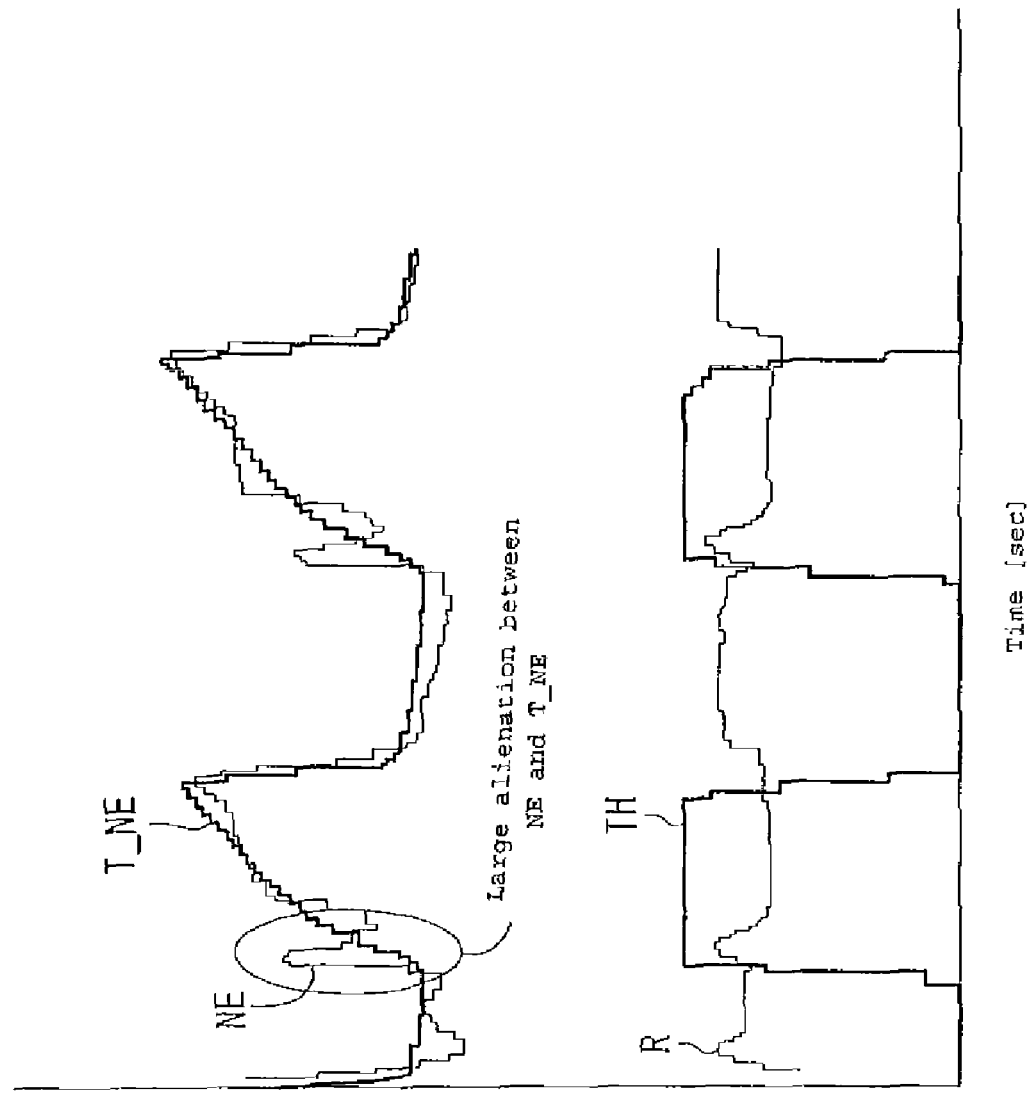
FIG. 7 is a graph showing the problem in the existing art.

FIG. 6 shows an example of the effect of this preferred embodiment obtained by the use of the processing shown in FIG. 3. As compared with the case of FIG. 7 showing the existing art, it is apparent from FIG. 6 that when reacceleration is performed after deceleration of the vehicle, a rapid increase in actual engine speed NE can be suppressed to thereby reduce the alienation between the actual engine speed NE and the target engine speed T_NE. Further, it is also apparent from FIG. 6 that a change in speed ratio R is gentle due to the suppression of a rapid increase in actual engine speed NE.

In the preferred embodiment mentioned above, it is determined whether or not reacceleration is performed just after deceleration of the vehicle 50 (i.e., whether or not the operation for reacceleration is performed just after fully closing the throttle valve 61 in the continuously variable transmission 10) (steps S1 and S2 in FIG. 3). When such reacceleration is determined, the shift control is suspended (steps S7 and S10). Accordingly, it is possible to correct for the alienation between the actual engine speed NE (actual output from the hydraulic motor 28) and the target engine speed T_NE (target output from the hydraulic motor 28) due to the pressure difference between the high-pressure oil passage 26 and the low-pressure oil passage 38 (see FIGS. 6 and 7). Thus, even when the vehicle 50 including the continuously variable transmission 10 is reaccelerated just after deceleration, causing the generation of the alienation between the actual engine speed NE and the target engine speed T_NE due to the pressure difference between the high-pressure oil passage 26 and the low-pressure oil passage 38, such alienation can be corrected and a harmful effect due to the reacceleration of the vehicle 50 (i.e., the operation for reacceleration in the continuously variable transmission 10) can be suppressed.

Whether or not the vehicle 50 is being reaccelerated is determined according to the throttle angle increase rate ΔTH and the engine speed increase rate ΔNE (steps S15 and S16 in FIG. 4 and step S32 in FIG. 5). When the vehicle 50 is being reaccelerated, the shift control of the continuously variable transmission 10 is suspended (steps S7 and S10 in FIG. 3). Accordingly, even when the engine speed NE is rapidly increased due to the reacceleration just after deceleration, unexpected shift control (upshifting) can be prevented, so that more desirable torque can be produced.

Further, according to a decrease in the engine speed increase rate ΔNE (step S8 in FIG. 3) or when the engine speed NE is lowered to the target engine speed T_NE (step S9 in FIG. 3), the shift control is resumed (step S11 in FIG. 3). Accordingly, the shift control is suspended only when there occurs a harmful effect due to the reacceleration just after deceleration in the continuously variable transmission 10, and the shift control can be immediately resumed when the harmful effect is removed.

In this preferred embodiment, whether or not the vehicle 50 is being decelerated (i.e., whether or not the operation for deceleration is being performed in the continuously variable transmission 10) is determined according to whether or not the throttle angle TH is equal to the minimum throttle angle TH_MIN. Further, whether or not the vehicle 50 is being reaccelerated (i.e., whether or not the operation for reacceleration is being performed in the continuously variable transmission 10) is determined according to whether or not the throttle angle TH has become the maximum throttle angle TH_MAX within the first predetermined time T1 (i.e., according to whether or not the throttle angle increase rate ΔTH has become greater than or equal to the threshold increase rate TH_ΔTH) and according to whether or not the engine speed increase rate ΔNE is greater than or equal to the threshold increase rate TH_ΔNE. However, the present invention is not limited to this preferred embodiment. For example, the deceleration and reacceleration of the vehicle 50 may be determined according to the rate of change in vehicle speed V [km/h/sec] or the rate of change in rotational speed [rev/sec] of the output shaft 34 of the hydraulic pump 12.

In this preferred embodiment, whether or not the throttle valve 61 is fully closed (i.e., whether or not the throttle angle TH is equal to the minimum throttle angle TH_MIN) is determined in step S12 shown in FIG. 4. However, the present invention is not limited to this preferred embodiment provided that the closed condition of the throttle valve 61 is determined. For example, the minimum throttle angle TH_MIN may be replaced by a throttle angle slightly larger than the minimum throttle angle TH_MIN (i.e., a throttle angle obtained by adding a predetermined value to the minimum throttle angle TH_MIN) in consideration of a determination error or the like. Similarly, whether or not the throttle valve 61 is fully closed (i.e., whether or not the throttle angle TH is equal to the maximum throttle angle TH_MAX) is determined in step S15 shown in FIG. 4. However, the present invention is not limited to this preferred embodiment provided that the open condition of the throttle valve 61 is determined. For example, the maximum throttle angle TH_MAX may be replaced by a throttle angle slightly smaller than the maximum throttle angle TH_MAX (i.e., a throttle angle obtained by subtracting a predetermined value from the maximum throttle angle TH_MAX).

In this preferred embodiment when it is determined that the vehicle 50 is reaccelerated just after deceleration, the operation of the shifting actuator 36 is stopped to temporarily stop the adjustment of the angle of the motor swash plate 32. However, the present invention is not limited to this preferred embodiment provided that it is possible to correct for the alienation between the actual engine speed NE (actual output from the hydraulic motor 28) and the target engine speed T_NE (target output from the hydraulic motor 28) due to the pressure difference between the high-pressure oil passage 26 and the low-pressure oil passage 38 during the reacceleration. For example, when it is determined that the vehicle 50 is reaccelerated just after deceleration, the shifting actuator 36 may be driven to temporarily move the motor swash plate 32 in the vertical direction (i.e., temporarily reduce the angle Di of the motor swash plate 32 to downshift), thereby correcting for the above alienation. As another modification, a new target engine speed T_NEa [rev/min] may be temporarily set by subtracting a predetermined value a from the target engine speed T_NE, and the above alienation may be corrected by using this new target engine speed T_NEa.

In this preferred embodiment, the conditions for resuming the shift control include that the engine speed increase rate ΔNE has been reduced (step S8: Yes in FIG. 3) and that the engine speed NE has become less than or equal to the target engine speed T_NE (step S9: Yes in FIG. 3). However, any one of these conditions may be used in the present invention. As another modification, the shift control may be resumed when a predetermined time has elapsed after the suspension of the shift control.

In this preferred embodiment, the engine 14 is used as a drive source. However, the engine 14 may be replaced by any drive source capable of applying torque to the input shaft 16 of the hydraulic pump 12.

Various other modifications may be made within the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control method for a hydraulic type continuously variable transmission having
a hydraulic pump adapted to be rotationally driven by a drive source,
a hydraulic motor adapted to be rotationally driven by an oil pressure generated by said hydraulic pump, and
a hydraulic circuit having:
a high-pressure oil passage for feeding a working fluid from said hydraulic pump to said hydraulic motor, and
a low-pressure oil passage for feeding said working fluid from said hydraulic motor to said hydraulic pump, said control method comprising the steps of:
determining whether or not a reaccelerating operation just after a decelerating operation is performed in said hydraulic type continuously variable transmission; and
correcting for an alienation between an actual output and a target output from said hydraulic motor due to the pressure difference between said high-pressure oil passage and said low-pressure oil passage when said reaccelerating operation is performed.

2. The control method for the hydraulic type continuously variable transmission according to claim 1, wherein:
said drive source comprises an engine;
said determining step is performed according to a rate of increase in throttle angle and a rate of increase in engine speed; and
said correcting step is performed by suspending shift control in said hydraulic type continuously variable transmission when said reaccelerating operation is performed.

3. The control method for the hydraulic type continuously variable transmission according to claim 2, wherein said shift control is resumed according to a decrease in the rate of increase in said engine speed.

4. The control method for the hydraulic type continuously variable transmission according to claim 2, wherein said shift control is resumed when said engine speed is lowered to a target value.

5. The control method for the hydraulic type continuously variable transmission according to claim 3, wherein said shift control is resumed when said engine speed is lowered to a target value.

6. The control method for the hydraulic type continuously variable transmission according to claim 1, wherein an electrical control unit is operatively connected to a shifting actuator for controlling an angle of inclination of a motor swash plate.

7. The control method for the hydraulic type continuously variable transmission according to claim 6, wherein the electrical control unit controls a speed ratio according to a difference between an actual engine speed and a target engine speed wherein when the actual engine speed is lower than the target engine speed, the electrical control unit decreases the speed ratio and wherein when the actual engine speed is higher than the target engine speed, the electrical control unit increases the speed ratio.

8. The control method for the hydraulic type continuously variable transmission according to claim 6, wherein when it is determined that reaccelerating is occurring just after deceleration, the shifting actuator is driven to temporarily move the motor swash plate in the vertical direction for correcting for the alienation.

9. The control method for the hydraulic type continuously variable transmission according to claim 8, wherein a new target engine speed may be temporarily set by subtracting a predetermined value from the target engine speed for correcting the alienation by using the new target engine speed.

10. The control method for the hydraulic type continuously variable transmission according to claim 1, wherein the deceleration and reacceleration is determined by a rate of change in a vehicle speed or the rate of change in a rotational speed of an output shaft of the hydraulic pump.

11. A control method for a hydraulic type continuously variable transmission comprising the following steps:
rotationally driving a hydraulic pump by a drive source,
rotationally driving a hydraulic motor by an oil pressure generated by said hydraulic pump, and
providing a hydraulic circuit including:
feeding a working fluid through a high-pressure oil passage from said hydraulic pump to said hydraulic motor, and feeding the working fluid through a low-pressure oil passage from said hydraulic motor to said hydraulic pump;

determining whether or not a reaccelerating operation just after a decelerating operation is performed in said hydraulic type continuously variable transmission; and correcting for an alienation between an actual output and a target output from said hydraulic motor due to the pressure difference between said high-pressure oil passage and said low-pressure oil passage when said reaccelerating operation is performed.

12. The control method for the hydraulic type continuously variable transmission according to claim 11, wherein:

said drive source comprises an engine;

said determining step is performed according to a rate of increase in throttle angle and a rate of increase in engine speed; and said correcting step is performed by suspending shift control in said hydraulic type continuously variable transmission when said reaccelerating operation is performed.

13. The control method for the hydraulic type continuously variable transmission according to claim 12, wherein said shift control is resumed according to a decrease in the rate of increase in said engine speed.

14. The control method for the hydraulic type continuously variable transmission according to claim 12, wherein said shift control is resumed when said engine speed is lowered to a target value.

15. The control method for the hydraulic type continuously variable transmission according to claim 13, wherein said shift control is resumed when said engine speed is lowered to a target value.

16. The control method for the hydraulic type continuously variable transmission according to claim 11, wherein an electrical control unit is operatively connected to a shifting actuator for controlling an angle of inclination of a motor swash plate.

17. The control method for the hydraulic type continuously variable transmission according to claim 16, wherein the electrical control unit controls a speed ratio according to a difference between an actual engine speed and a target engine speed wherein when the actual engine speed is lower than the target engine speed, the electrical control unit decreases the speed ratio and wherein when the actual engine speed is higher than the target engine speed, the electrical control unit increases the speed ratio.

18. The control method for the hydraulic type continuously variable transmission according to claim 16, wherein when it is determined that reaccelerating is occurring just after deceleration, the shifting actuator is driven to temporarily move the motor swash plate in the vertical direction for correcting for the alienation.

19. The control method for the hydraulic type continuously variable transmission according to claim 18, wherein a new target engine speed may be temporarily set by subtracting a predetermined value from the target engine speed for correcting the alienation by using the new target engine speed.

20. The control method for the hydraulic type continuously variable transmission according to claim 11, wherein the deceleration and reacceleration is determined by a rate of change in a vehicle speed or the rate of change in a rotational speed of an output shaft of the hydraulic pump.

* * * * *